E. F. GOODYEAR.
WHEEL FOR VEHICLES.
APPLICATION FILED OCT. 17, 1914.
1,280,715.
Patented Oct. 8, 1918.
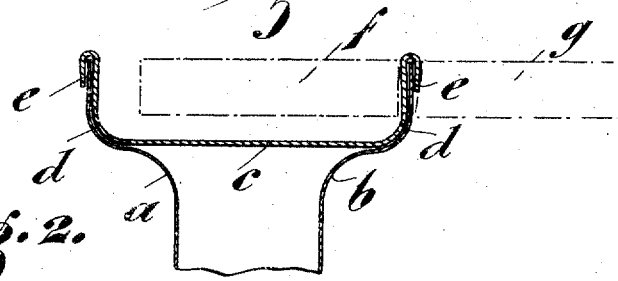
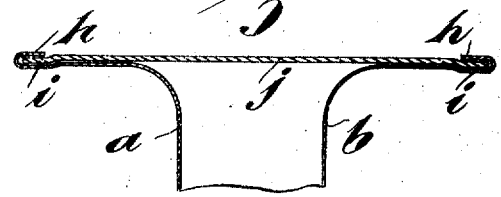
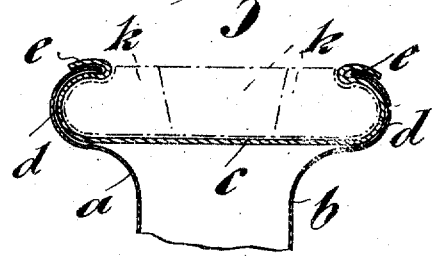
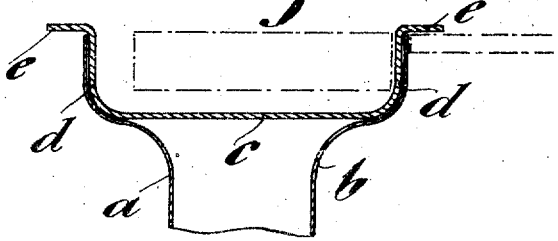
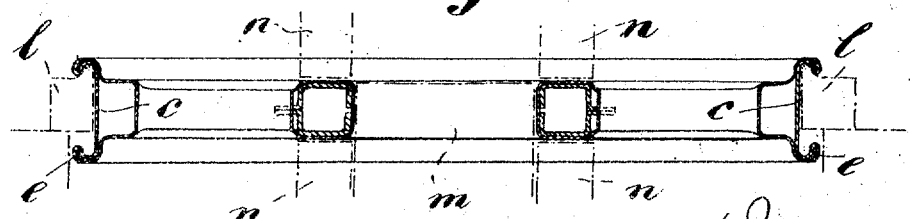

UNITED STATES PATENT OFFICE.

ERNEST FREDERICK GOODYEAR, OF DUDLEY, ENGLAND.

WHEEL FOR VEHICLES.

1,280,715.　　　　　Specification of Letters Patent.　　Patented Oct. 8, 1918.

Application filed October 17, 1914. Serial No. 867,141.

*To all whom it may concern:*

Be it known that I, ERNEST FREDERICK GOODYEAR, a subject of the Kingdom of Great Britain, residing at Reliance Works, Dudley, in the county of Worcester, England, manufacturer, have invented certain new and useful Improvements in Wheels for Vehicles, of which the following is a specification.

This invention comprises certain improvements in or relating to wheels, such as the road wheels of automobiles and the like, and more particularly to such of these wheels as are composed of steel or other suitable metal.

This invention is particularly applicable to the type of wheel in which two sheaves or half members are used in building up the wheel, said sheaves or half members being jointed at substantially the central plane of the wheel. In such an arrangement the two main sheaves each forming or relating to one half of the wheel have in the finished wheel the semi-spoke formation, the semi-channel formation at the circumference, and a suitable formation at or near the center pressed or suitably incorporated, after which the sectors between the spokes are advantageously removed.

In such a wheel the standard or other section rim for carrying the tire may be assembled in the form of a member which is separable from the two sheaves or halves of the wheel.

The present invention comprises a new construction of that part of the wheel associated with or involving the tire-carrying rim, also a new process of manufacture involved in arriving at such a construction.

By my present invention I am enabled to electrically weld the sheaves to the separable rim; my present invention, however, is not confined to the electric welding as other processes of welding may, if desired, be adopted.

According to the present invention the sheaves are welded to the sheet metal which is to be subsequently formed into the tire-carrying rim before such tire-carrying rim has been finally shaped or formed, or before the edges of such tire-carrying rim have been curved or bent to their final shape enabling them to grip or embrace the beads of the tire. By connecting, according to the present invention, the metal of the sheaves to a ring or strip of metal, which latter is afterward formed into the tire-carrying rim, I am enabled to weld or equivalently connect the metal in the manufacture of the rim part of the wheel in a much more satisfactory and convenient manner, and in the case of electric welding in a manner which is impossible with the tire-carrying rim formed to its final shape before the welding or connecting operation is carried out.

In order that this invention may be clearly understood and readily carried into practice, reference may be had to the appended explanatory sheet of drawings, upon which:—

Figure 1 illustrates a partly formed tire-carrying rim assembled in relation to the sheaves, and in the position for being welded to such sheaves prior to the final forming of the rim to its ultimate shape.

Fig. 2 illustrates a modification of the part shown in Fig. 1.

Fig. 3 illustrates a further modification of the part shown in Fig. 1.

Fig. 4 illustrates the rim finally produced after the welding operation has been carried out in connection with the parts of the form shown in Fig. 1 or Fig. 2.

Fig. 5 illustrates a further modification of the parts shown in Fig. 1.

Fig. 6 illustrates a modification of the parts shown in Fig. 4.

In a convenient method of carrying out the present invention, as shown in Fig. 1, the two sheaves $a$, $b$ of the wheel are assembled in relation to a partly formed rim member $c$ which is of shallow channel or U formation, the sides $d$ of the U being substantially parallel or diverging in a direction away from the center of the wheel, the extreme edges $e$ of these sides being folded over through an angle of 180 degrees to embrace the edges of the sheaves $a$, $b$, which latter embrace the sides of the channel or U-shaped member to be afterward formed into the tire-carrying rim.

The folding of the edges $e$ of the rim member $c$ over the edges of the sheaves $a$, $b$ may be carried out in any suitable or convenient manner, and after the parts have been coupled together by this folded connection the process of welding is proceeded with in such a manner that the folded or outwardly turned edge $e$ of the rim is welded to the outer surface of the sheave $a$ or $b$ over which it is folded.

In the case of electric welding in which it is necessary to employ water cooled rollers $f$, $g$ on both sides of the part under the welding operation, the positioning of the parts provides sufficient space for a welding wheel $f$ to engage with the inner surface of the side wall of the channel member at a point opposite to the point at which the outer welding wheel $g$, the periphery of which may be slightly coned or of other suitable shape, is applied to weld the extreme edge of the channel member to the sheave. A particularly satisfactory process of electric welding can thus be carried out, the outer welding wheel $g$ being brought upon the folded part of the channel member with sufficient pressure to effectively weld the latter and form a clean joint of particularly high quality both in regard to strength and in regard to the capacity for excluding moisture, and for providing a water-tight joint between the sheaves and the channel member.

In this welding operation the partly finished wheel may be rotated on a spindle corresponding with its axis, and the welding wheel $f$ within the channel may be rotated by contact of the wheel with such inner welding wheel $f$, while the outer welding wheel $g$ carried upon a lever may be applied with suitable pressure to the point at which the welding heat is applied.

Instead of assembling the partly finished tire-carrying rim in the form of a shallow channel or U-shaped member, as shown in Fig. 1, it may be assembled in the form of a cylindrical ring $j$ as shown in Fig. 2, in which case the edges of the sheaves $a$, $b$ are bent outwardly substantially at right angles to the plane of the wheel, and are afterward embraced by the folded edges $c$ of the cylindrical rim member. Welding can in this arrangement be satisfactorily carried on with the rim member still in the cylindrical form, after which the rim member together with the edges of the sheaves may be bent or worked to the desired formation of the finished tire-carrying rim.

In a modification of the last described arrangement shown in Fig. 3, instead of folding the edges of the cylindrical member $j$ constituting the unfinished tire-carrying rim around the edges of the sheaves, the edges $h$ of the sheaves may be folded around the cylindrical member constituting the unfinished tire-carrying rim, in which arrangement the edges $i$ of the latter are advantageously cranked or off-set throughout the circumference, the degree of cranking or off-setting being advantageously equal to the thickness of the metal of the sheaves, so that after the metal of the sheave has been folded around the edge of the cylindrical member, the outer circumferential face of the folded portion of the sheave is in peripheral alinement with the outer cylindrical surface of the sheet metal constituting the partly finished rim. The welding process is adapted to fill any slight crevices between the extreme edge of the sheave and the shoulder formed by the off-setting of the cylindrical rim portion so that after welding a perfectly even external surface may be obtained at the joint, which external surface ultimately becomes the internal surface of the tire-carrying portion of the wheel, and by this clean internal surface damage to the beads of the tire is rendered impossible.

In the two arrangements last described the cylindrical member $j$ may in an after process or processes be partly formed into the tire-carrying rim by an operation or operations which enlarge the edges and bend them to form a shallow channel or U-member, as in the first described embodiment of the present invention.

Instead of folding the edges $e$ of the rim over the edges of the sheaves before the welding process as described with reference to Fig. 1, the welding process may be carried on with the edges $e$ projecting at right angles as shown at Fig. 5, in which case the sheave $d$ is welded at its inner surface to the U-shaped member, the edge $e$ being afterward folded so that in the final wheel it occupies the position shown in Fig. 4.

For the purpose of forming the shallow channel or U-member into the desired formation of the finished tire-carrying rim resistance members $k$ may be inserted within the interior of the channel member, such resistance members being divided at points around the circumference to permit of assembling, and being advantageously in three portions distributed across the width of the channel, the two side portions being of form or configuration corresponding with the internal surface of the finished tire-carrying rim, while the central portion is of wedge formation with its sides slightly converging toward the center of the wheel. After such resistance members have been inserted within the channel, the sides of the latter are operated upon from one or both sides of the wheel by press members which press or work the edge of the channel over into the hook formation characteristic of a tire-carrying rim, whereby the latter is enabled to embrace and grip the beads of the tire.

Fig. 6 illustrates a modified means providing for the forming of the shallow channel or U-member into the desired formation of the finished tire-carrying rim. $l$ is a composite ring of the shape shown and which is in three parts divided at intervals in the circumference; the parts being hinged together so that they can close around the rim to occupy the position shown, in which position the rim rests upon them. In this position the wheel is placed in relation to a centralizing member $m$ and is retained by upper and lower setting members $n$ which securely hold in position the wheel during the application of a descending press member adapted to bend the edge of the rim around the ring $l$ into the form shown. In this operation the descending press member has also the effect of contracting the composite ring $l$ by which operation the rim is rendered precisely circular. The same operation is repeated in connection with the other side of the wheel.

In an alternative method of manufacture, the members $k$ may be dispensed with, and after the welding process the edges of the tire-carrying rim may be formed to the desired shape by a spinning process.

What I claim as my invention and desire to secure by Letters Patent is:—

1. The process of manufacturing sheet metal wheels composed of or involving two sheaves or disk members, and a rim or circumferential member for carrying a tire which includes folding the edge of one of said members over the coöperating edge of the other along each side of the rim prior to the forming of the tire carrying portion of the wheel to its final shape.

2. The process of manufacturing sheet metal wheels composed of or involving two sheaves or disk members, and a rim or circumferential member for carrying a tire which includes folding the edge of one of said members over the coöperating edge of the other along each side of the rim prior to the forming of the tire carrying portion of the wheel to its final shape, and welding the rim to the sheaves also before forming the tire carrying portion of the wheel to its final shape.

3. The process of manufacturing sheet metal wheels composed of or involving two sheaves or disk members, and a rim or circumferential member for carrying a tire which includes folding the edge of one of said members over the coöperating edge of the other along each side of the rim prior to the forming of the tire carrying portion of the wheel to its final shape, and electrically welding the rim to the sheaves also before forming the tire carrying portion of the wheel to its final shape.

4. The manufacture of a wheel comprised of two sheaves or disk members, and a rim or circumferential member, in which the outer portion of the wheel is formed to engage a tire, which includes welding the rim to the sheaves along the edges of the rim and sheaves prior to the forming of the tire carrying portion of the wheel to its final shape.

5. The process of manufacturing sheet metal wheels comprising two sheaves or disk members, and a rim or circumferential member in which the outer portion of the wheel is formed to accommodate a tire, consisting in folding one edge of one of said members over the coöperating edge of another along one side of the rim prior to the forming of the tire carrying portion of the wheel to its final shape, and electrically welding the rim to the sheaves also before forming the tire carrying portion of the wheel to its final shape.

In witness whereof I have hereunto set my hand in the presence of two witnesses.

ERNEST FREDERICK GOODYEAR.

Witnesses:
 ARTHUR H. BROWN,
 HOLLIS F. BROWN.